(12) United States Patent
Shih

(10) Patent No.: US 6,743,312 B2
(45) Date of Patent: Jun. 1, 2004

(54) METHOD OF FABRICATING A BALL PROTECTIVE MASK

(75) Inventor: Jung-Tso Shih, San Chung (TW)

(73) Assignee: Yu Hsun Enterprise Co., Ltd., Taipei Hsien (TW)

( * ) Notice: Subject to any disclaimer, the term of this patent is extended or adjusted under 35 U.S.C. 154(b) by 79 days.

(21) Appl. No.: 10/260,394

(22) Filed: Oct. 1, 2002

(65) Prior Publication Data

US 2004/0060624 A1 Apr. 1, 2004

(51) Int. Cl.[7] ............... B21C 23/00; C22F 1/04
(52) U.S. Cl. ............ 148/690; 72/254; 72/255; 72/256; 2/9; 2/424; 2/425
(58) Field of Search ............ 72/254, 255, 256; 2/425, 424, 9; 148/689, 690

(56) References Cited

U.S. PATENT DOCUMENTS 3,854,146 A * 12/1974 Dunning .................. 2/9
5,806,088 A * 9/1998 Zide et al. ............... 2/9
6,497,773 B1 * 12/2002 Shih ..................... 148/517
6,622,364 B2 * 9/2003 Hamilton et al. ........ 29/416

FOREIGN PATENT DOCUMENTS

CN          1394980 A  *  2/2003  ........... A41D/13/11

* cited by examiner

Primary Examiner—George Wyszomerski
Assistant Examiner—Janelle Combs-Morillo
(74) Attorney, Agent, or Firm—Birch, Stewart, Kolasch & Birch, LLP

(57) ABSTRACT

A method of fabricating ball protective mask includes (1) aluminum extrusion: the aluminum extruded structure has a suitably shaped outer ring frame and densely packed hollow holes so that the cross section thereof forms a grid-like structure, two sides thereof being provided with lugs; (2) slicing; (3) deburring by punching; (4) punch forming: the slice is punched to form a curved mask to accomplish an inchoate form of the mask; (5) subjecting the mask to heat treatment to obtain a product with satisfactory surface hardness.

3 Claims, 5 Drawing Sheets

METHOD OF FABRICATING A BALL PROTECTIVE MASK

BACKGROUND OF THE INVENTION (a) Field of the Invention

This invention relates to a method of fabricating a ball protective mask, more particularly to a fast processing and forming method in which an aluminum extruded material is cut into slices, which are deburred by punching and then bent into shape, and which are further subjected to annealing at a specific temperature and time. The production process can be streamlined and the masks produced have better smoothness and do not have welding points. Hence, the masks are safe to wear and are more appealing.

(b) Description of the Prior Art

A conventional method of making a protective mask for ball games is as follows:

1. Material forming: A plurality of rod-like or curved iron materials of suitable length and thickness are cut to serve as basic rods and strips for constructing a mask.
2. Welding: The rod materials are welded together by using electric welding or oxy-acetylene flames to form a reticulating web-like protective mask.
3. Coating: Immerse the welded and anti-rust mask into a plastic powder bath.

After drying, a layer of plastic housing forms on the surface of the mask.

However, such a conventional method of making masks suffers the following the drawbacks:

1. As the conventional method uses iron and steel as material, the weight is heavy. In use, wearing a heavy mask is not comfortable during the game. Besides, iron material may rust easily.
2. The use of welding is laborious, and the rate of defective products is also high. Besides, labor costs is high.
3. As the material used in the conventional method is not subjected to any special treatment, the surface strength and the shock-absorbing effect thereof are not good.

However, in the above steps, material cutting, welding and coating all require complicated manual operations, which increase labor costs and lead to higher defective product rate. Besides, the shape and quality cannot be controlled easily.

SUMMARY OF THE INVENTION

Therefore, the primary object of the invention is to provide a method of fabricating a ball protective mask to eliminate the drawbacks of the prior art. According to the invention, specially shaped aluminum extruded material is formed and cut into slices of suitable thickness, which are deburred by punching and bent into shape, thus eliminating the operations of annealing and welding. After formation, the invention is subjected to annealing at a specific temperature and time. The operation is fast and streamlined. Besides, the mask has no welding points to ensure safety during wearing.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
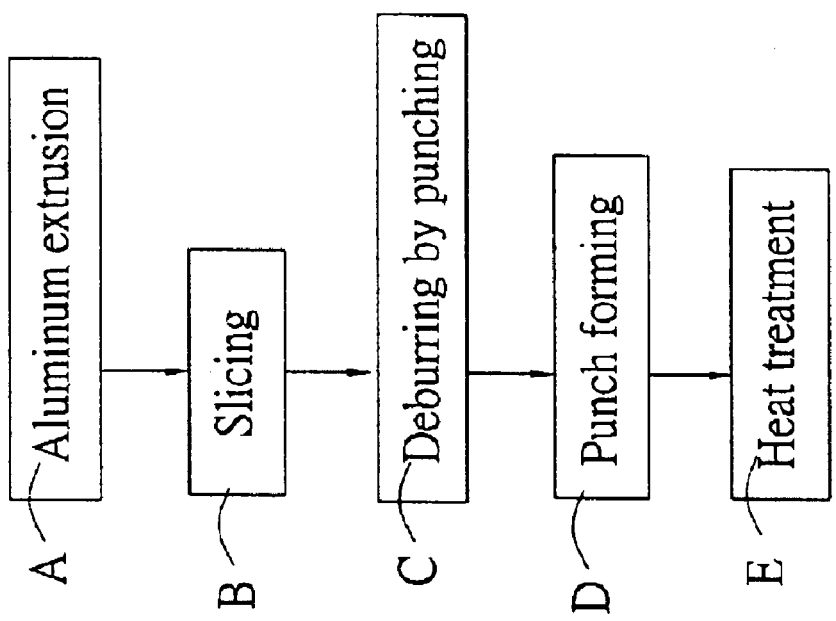
FIG. 1 is a process flowchart of the invention.
Figure 2:
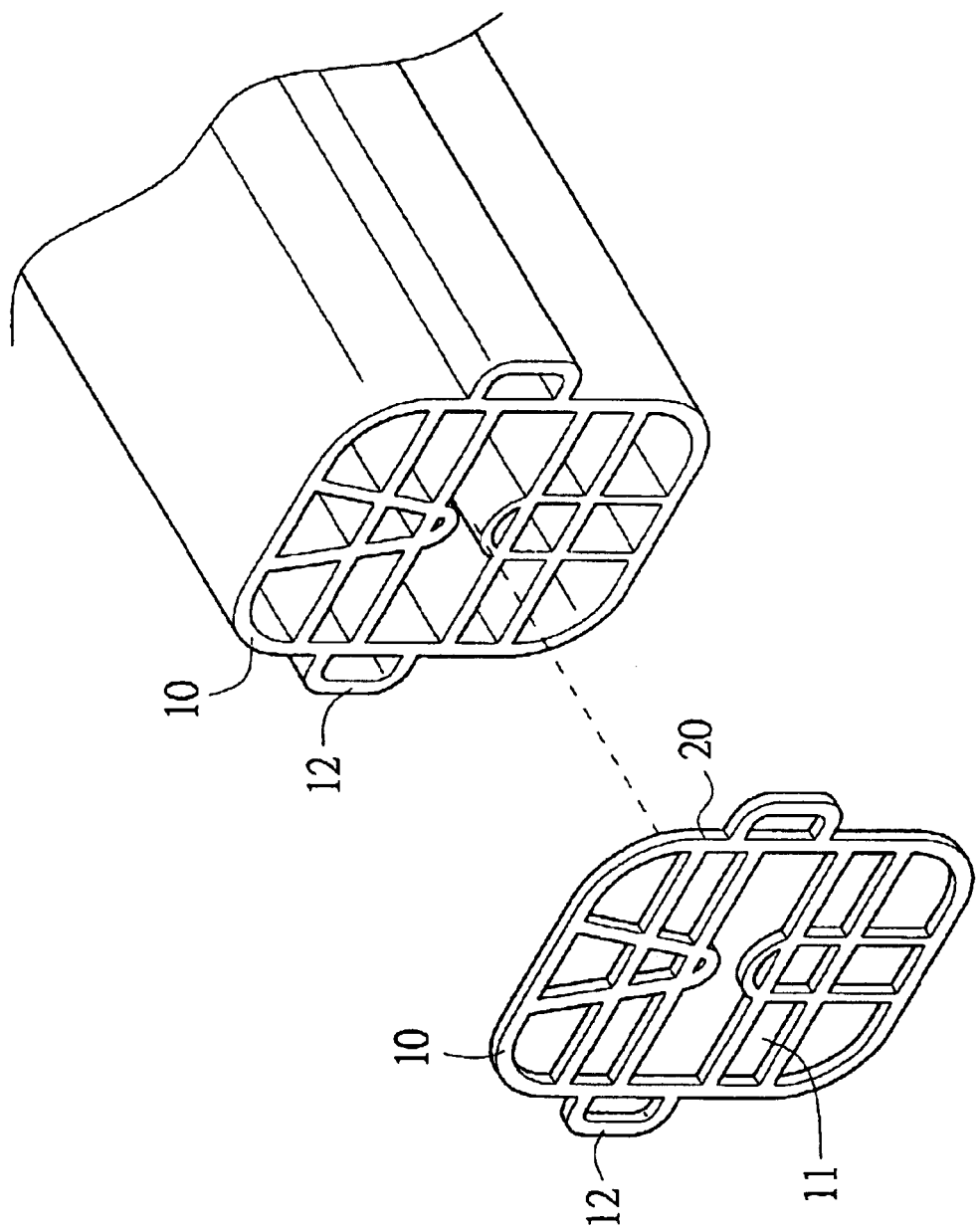
FIG. 2 is a schematic view of the cutting of aluminum extruded material into slices according to the flowchart of the invention.
Figure 3:
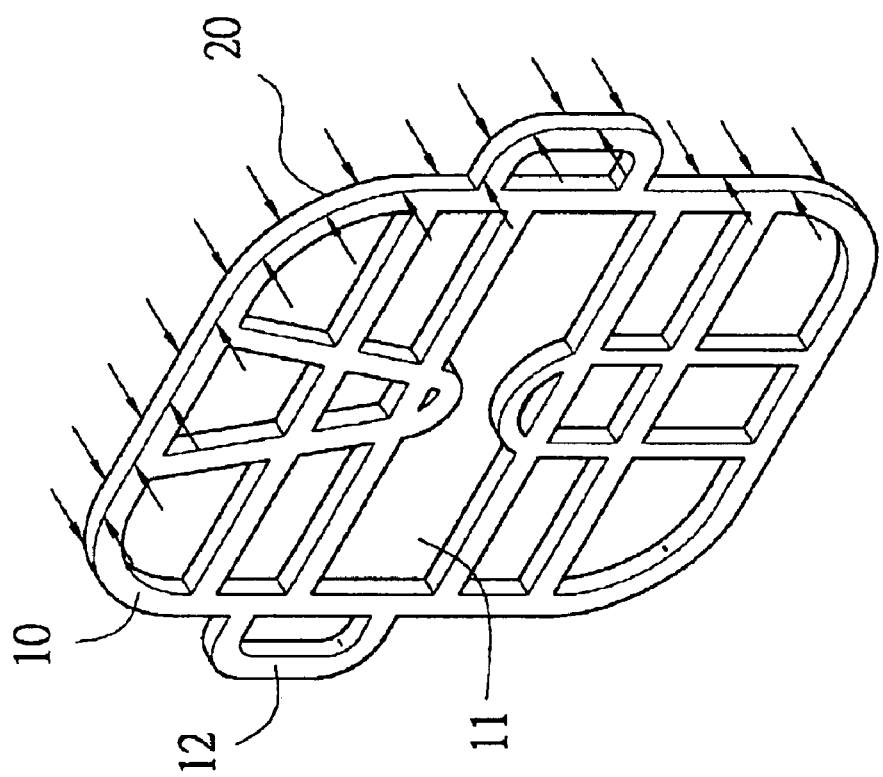
FIG. 3 is a schematic view illustrating the process of deburring the slices by punching according to the flowchart of the invention.
Figure 4:
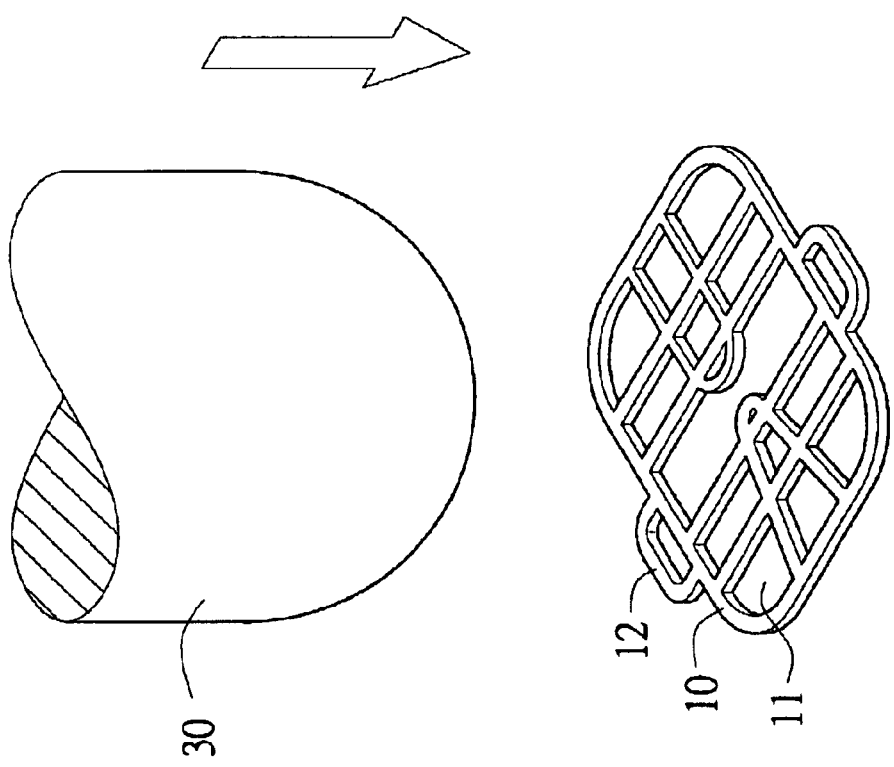
FIG. 4 is a schematic view of the process of punching the slices into shape according to the flowchart of the invention.
Figure 5:
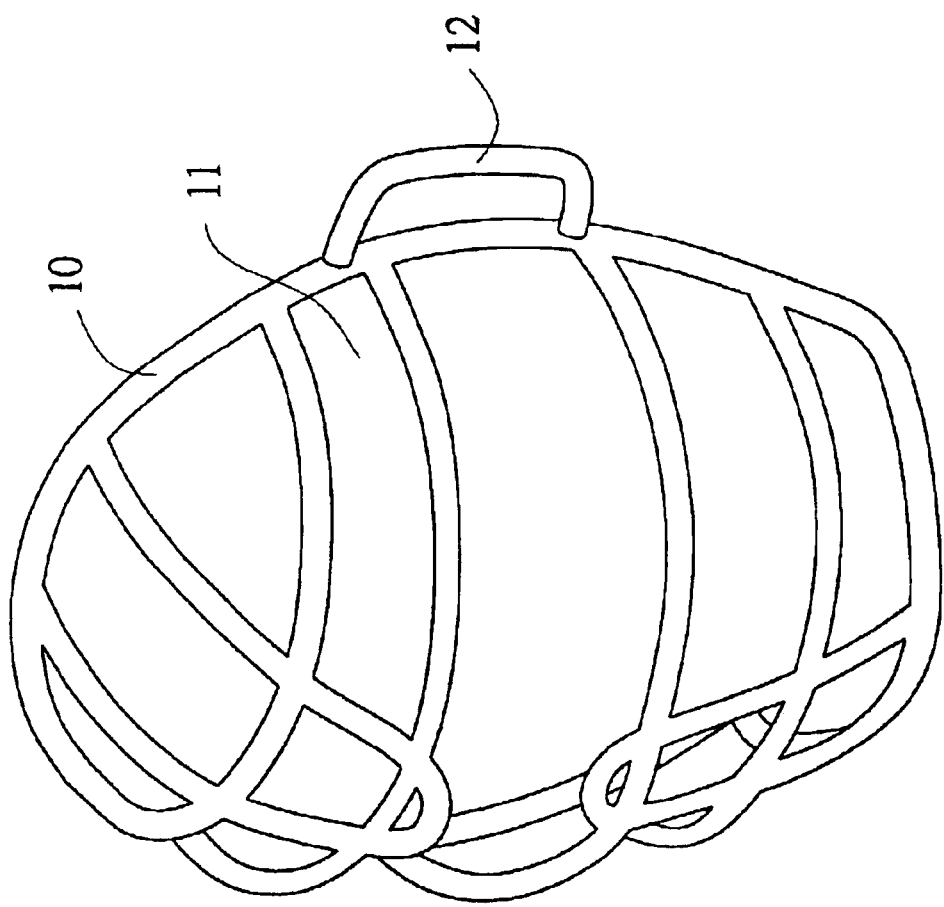
FIG. 5 is an elevation view of a mask formed according to the method of the invention.

Referring to FIG. 1, the process flow of this invention has the following steps:

1. Aluminum extrusion (A): Referring to FIGS. 1 and 2, first, the substrate material for aluminum extrusion has a suitably shaped outer ring frame 10 and an interior with densely packed hollow holes 11 so that its cross section forms a grid-like structure, and the two sides are provided with projecting lugs 12.
2. Slicing (B): Referring to FIGS. 1 and 2, the extruded aluminum extracted substrate is cut into slices of suitable thickness.
3. Deburring by punching: Referring to FIGS. 1, 2 and 3, the suitably thick slices form angles 20 (or burrs) at the cutting edges of the outer ring frame 10 and the hollow holes 11. The angles 20 are inverted by punching to thereby remove the burrs (edges) of the cut substrate slices.
4. Punch forming (D): Referring to FIGS. 3 and 4, the slice is punched into shape to form a curved mask, thereby accomplishing an inchoate form of the mask.
5. Subjecting the mask to heat treatment:

The heat treatment can be achieved by performing the following steps:

1. T4 treatment: At T4 treatment temperature, i.e., the mask is subjected to a constant temperature treatment at a suitable temperature selected from the range between 450° C. to 550° C. (note: the temperature will vary according to the material), and the temperature is kept constant for 1 hour and 30 minutes. Then, the mask is subjected to hardening treatment. The tolerable difference of the constant temperature in the furnace is within ±3°, and the delay time for hardening is 7 seconds. Preferably, the water temperature does not exceed 30° C.
2. T6 treatment temperature: That is, a suitable temperature is selected from between 110° C. to 120° C. (depending on the requirement of the material). After a constant temperature heat treatment for 24 hours, the mask is subjected to cooling. At the same time, with the above constant temperature kept within ±3°, good characteristics can be maintained.
3. Surface treatment: The mask is subject to anode treatment. Alternatively, further dying treatment or plastic encapsulation is also acceptable.

The present invention has the following advantages in use:

1. In practice, the present invention eliminates the steps of pre-position and material preparation, i.e. aluminum alloy is subjected to special annealing before being cut into strips, and adopts aluminum extrusion integral formation, which is faster in speed and can immediately form a semi-finished product of a better quality.
2. The invention eliminates the step of welding during the manufacturing process. In addition to saving welding equipment cost, time is also saved. Besides, defective products due to improper welding can be prevented. More importantly, the mask of the invention is very even and smooth on the inside and on the outside, and hence will not hurt the face.

3. The invention is formed by aluminum extrusion, which is more precise and can be easily controlled, thereby eliminating the size error associated with use of white iron welding in the prior art. Moreover, the product of this invention does not rust easily.

4. The invention, after subjecting to special annealing and hardening treatment, can withstand a tensile strength up to above 70000 psi according to experiments, and the hardness is about 120BHN, extension rate 14% to 21%; yield strength above 60000 psi. The strength of the invention is higher than conventional iron mask.

5. Since the invention is formed by aluminum extrusion to form a strip without sections or segments, the strength thereof is better than the prior art which uses welding.

Although the present invention has been illustrated and described with reference to the preferred embodiment thereof, it should be understood that it is in no way limited to the details of such embodiment but is capable of numerous modifications within the scope of the appended claims.

What is claimed is:

1. A method of fabricating a ball protective mask, comprising:
   (1) extruding an aluminum material to form a substrate, which has an outer ring frame of a suitable shape and an interior provided with densely packed hollow holes so that the cross section thereof forms a grid-like structure and both sides thereof are provided with projecting lugs;
   (2) slicing: the extruded aluminum extracted substrate is cut into slices of suitable thickness,
   (3) deburring by punching: the suitably thick slices form angles or burrs at the cutting edges of the outer ring frame and the hollow holes, the angle being inverted by punching to thereby remove the burrs at the cutting edges;
   (4) punch forming (D): the slice is punched into shape to form a curved mask, thereby accomplishing an inchoate form of the mask,
   (5) subjecting the mask to heat treatment to obtain a product with satisfactory surface hardness.

2. The method of fabricating a ball protective mask as claimed in claim 1, wherein the heat treatment includes the following steps:
   (1) the mask is subjected to a constant temperature treatment at a suitable temperature selected from the range between 450° C. to 550° C., and the temperature is kept constant for 1 hour and 30 minutes; then, the mask is subjected to hardening treatment, the tolerable difference of the constant temperature in the furnace being within ±3°, and the delay time before hardening being 7 seconds, the hardening comprising subjecting the mask to water at a temperature preferably not exceeding 30° C.,
   (2) a suitable temperature is selected from between 110° C. to 120° C. for heat treatment of the mask at a constant temperature for 24 hours and the mask is then subjected to cooling, wherein good characteristics can be maintained where the constant temperature is kept within ±3°; and
   (3) surface treatment: subjecting to anodizing.

3. The method of fabricating a ball protective mask as claimed in claim 2, wherein, after surface treatment, the mask is subjected to further dying treatment or plastic encapsulation.

* * * * *